US006541943B1

(12) United States Patent
Wylie et al.

(10) Patent No.: US 6,541,943 B1
(45) Date of Patent: Apr. 1, 2003

(54) REGULATOR FOR BOOSTING THE OUTPUT OF AN ALTERNATOR

(75) Inventors: John R. Wylie, Richardson, TX (US); Jimmy G. Stroud, Bedford, TX (US)

(73) Assignee: Penntex Industries, Inc., Fort Worth, TX (US)

( * ) Notice: Subject to any disclaimer, the term of this patent is extended or adjusted under 35 U.S.C. 154(b) by 16 days.

(21) Appl. No.: 09/798,170

(22) Filed: Mar. 2, 2001

(51) Int. Cl.[7] .......................... H02H 7/06; H02P 11/00; H02P 9/00
(52) U.S. Cl. .......................................... 322/28; 322/17
(58) Field of Search ............................. 322/28, 17, 61, 322/59, 44

(56) References Cited

U.S. PATENT DOCUMENTS

| 4,636,705 A | * | 1/1987 | Bowman .................... 307/110 |
| 4,636,706 A | * | 1/1987 | Bowman et al. ............ 320/153 |
| 4,670,705 A | * | 6/1987 | Sievers et al. ................ 322/28 |
| 4,682,044 A | * | 7/1987 | Hotate et al. ................ 123/399 |
| 5,712,786 A | * | 1/1998 | Ueda ....................... 123/339.1 |
| 5,929,613 A | * | 7/1999 | Tsuchiya et al. ............... 322/28 |
| 6,043,632 A | * | 3/2000 | Maehara et al. ............... 322/28 |
| 6,346,797 B1 | * | 2/2002 | Perreault et al. ............... 322/28 |
| 6,392,577 B1 | * | 5/2002 | Swanson et al. ............ 341/144 |
| 6,462,516 B1 | * | 8/2002 | Watanabe ..................... 322/28 |
| 6,456,048 B2 | * | 9/2002 | Taniguchi et al. ............ 322/28 |
| 6,462,517 B2 | * | 9/2002 | Asada ......................... 322/28 |

* cited by examiner

Primary Examiner—Karl Tamai
Assistant Examiner—Pedro J. Cuevas
(74) Attorney, Agent, or Firm—Arthur F Zobal (57) ABSTRACT

The regulator includes a control circuit for controlling a transistor switch. The switch has an output coupled to a field terminal which is to be coupled to the rotor's field coil. The regulator also includes a stator terminal coupled to the control circuit; an ignition terminal coupled to the control circuit for turning the regulator on and off; and a positive battery terminal coupled to the control circuit. A bank of capacitors is coupled between the stator terminal and the input of the switch. The rectifier has an anode coupled to the battery terminal and a cathode coupled to the input of the switch. The capacitor bank in conjunction with the rectifier boost the voltage to the switch and the field. This increases the maximum output of the alternator.

2 Claims, 5 Drawing Sheets

REGULATOR FOR BOOSTING THE OUTPUT OF AN ALTERNATOR

BACKGROUND OF THE INVENTION

1. Field of the Invention

The invention relates to a regulator used for controlling an alternator of a motor vehicle.

2. Description of the Prior Art

In a motor vehicle a regulator is used in combination with an alternator to monitor and maintain the system voltage by varying the alternators output current. The regulator does this by varying the rotor's field current which controls the alternator's output current. Thus the output current of the alternator is a function of the rotor field current. For this reason, if the system voltage decreases too low for any reason, then the current in the rotor's field will decrease reducing the alternators maximum current. When an alternator is running at a low RPM and high output current the temperature of the windings increases due to low air flow and high resistance losses. This increase in temperature raises the resistance of the field further decreasing the maximum alternator output. If the alternator's maximum current falls below the system requirements then the battery well will discharge to the point where the engine quits running. This is a common scenario with specialty vehicles such as buses, firetrucks, ambulances, limousines, and police cars that have large electrical loads and frequently operate at low engine RPM while parked.

SUMMARY OF THE INVENTION

It is an object of the invention to provide a capacitor-diode arrangement in a regulator to boost the regulator output to the rotor field coil of the alternator and hence the output of the alternator when needed. The invention is termed "Field Current Droop Compensation" or "FCDC" as it will be referred to hereinafter. The increased output voltage to the rotor's field coil that FCDC provides will add approximately 20% increase to the output current capability of any alternator. This increased output is used to compensate for normal operating factors that reduce the field current thus limiting the maximum output of the alternator. The maximum output current of an alternator is a function of field current, temperature, RPM and other factors. When an alternator is operating at low RPM and high output current the temperature of the windings increases dramatically due to the low volume of air flow and high resistive losses. This temperature increase raises the resistance of the rotor's field coil windings which decreases the current through the field and the maximum output current of the alternator. When the charging system is under heavy load due to deeply depleted batteries and/or high system demands, the system voltage decreases as a result. This decrease in system voltage further reduces the current in the rotor's field and the maximum alternator output. This can lead to a runaway discharge condition if the maximum alternator output falls below system demands. Eventually the battery will discharge to the point where the engine quits running. FCDC increases the voltage and current available to the rotor's field to help prevent the runaway discharge condition. This system is not limited to any particular alternator or charging system. It can be used with any alternator based charging system or various systems of different voltages.

The regulator includes a control circuit for controlling a control switch. The control switch has an output coupled to a field terminal which is to be coupled to the rotor's field coil. The regulator also includes a stator terminal coupled to the control circuit, an ignition terminal coupled to the control circuit for turning the regulator on and off; and a positive battery terminal coupled to the control circuit. The capacitor-diode arrangement comprises a capacitor means coupled between the stator terminal and the input of the control switch. The diode has an anode coupled to the battery terminal and a cathode coupled to the input of the switch.

DESCRIPTION OF THE PRIOR ART VEHICLE CHARGING SYSTEM

Figure 1:
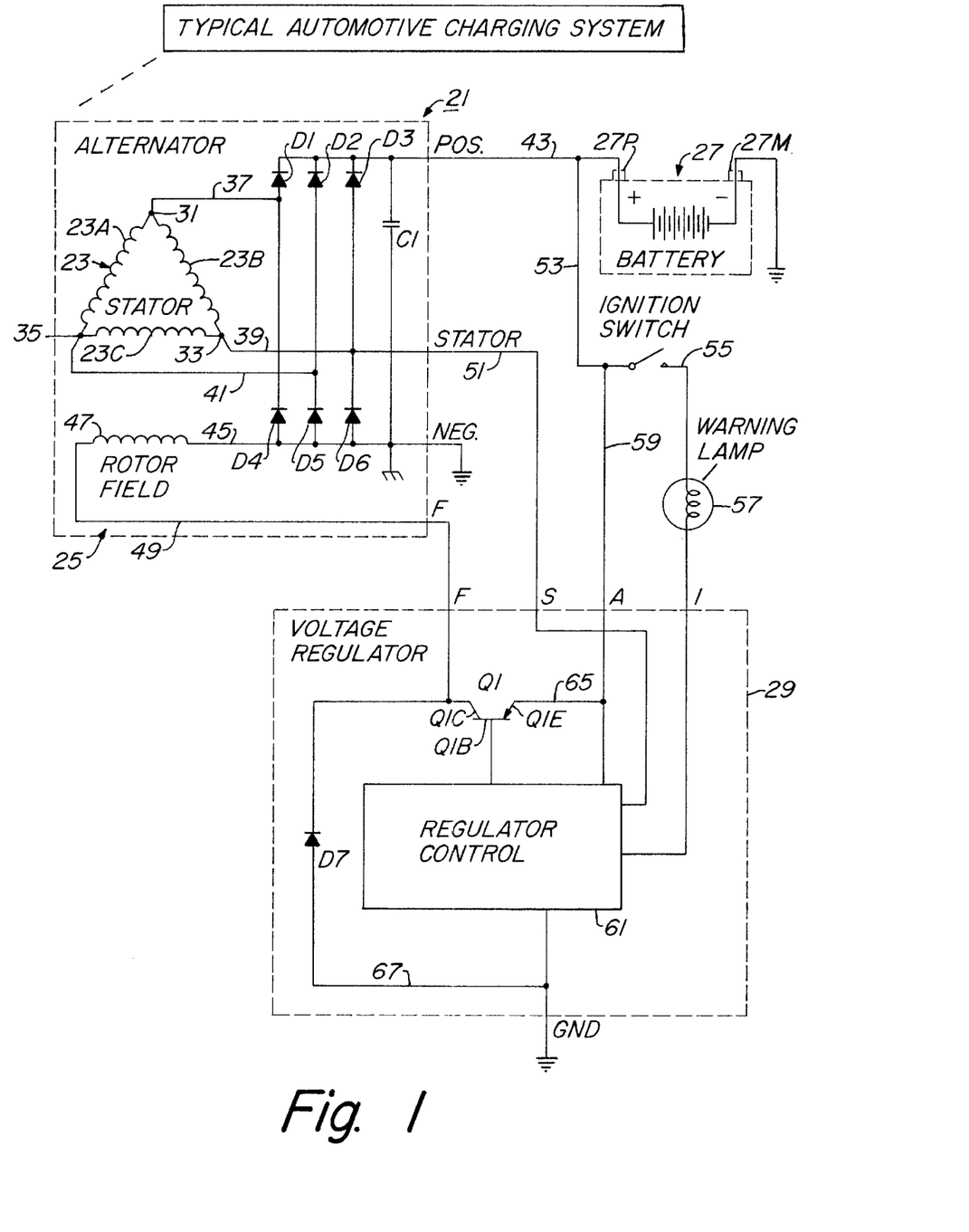
FIG. 1 is a schematic of a typical prior art vehicle charging system.

Referring to FIG. 1, the charging system comprises an alternator 21, comprising a stator 23 and a rotor 25 for charging a 12 volt battery 27 and a regulator 29 for applying electrical power to the alternators rotor field. The battery stores electrical charge used to supply the electrical system when the engine is not running and to crank the engine. The alternator converts the mechanical energy from the engine, when running, into electrical current used to supply the electrical system and recharge the battery. The amount of current that the alternator is required to produce varies with the demand of the electrical system and the charge state of the battery. The output current of the alternator is a product of rotor field current, RPM, temperature and manufacturing tolerances. The regulator monitors and maintains the system voltage by varying the alternators output current. The regulator does this by varying the rotor's field current which directly controls the alternators output current.

The alternator 21 shown has a three phase stator comprising coils 23A, 23B and 23C connected in a delta configuration. Stator taps 31, 33, and 35 are connected to leads 37, 39, and 41 to which diodes D1, D2, D3, D4, D5, D6 are connected as shown. The cathodes of diodes D1, D2, D3 are connected to lead 43 which is connected to the plus terminal 27P of battery 27 with its minus terminal 27M connected to ground. The anodes of diodes D4, D5, D6 are connected to lead 45 which is connected to ground and to one end of the rotor field coil 47. The other end of the coil 47 is connected to lead 49 which is connected to the F terminal of the regulator 29. A capacitor C1 is connected to leads 43 and 45. A lead 51 is connected to lead 39 and to the S terminal of regulator 29. Lead 53 is connected to lead 43 and to the I terminal of the regulator 29. The lead 53 includes an ignition switch 55 and a warning lamp 57. A lead 59 is connected to lead 53 and to the A terminal of the regulator 29. The regulator 29 includes a control system 61 and a transistor Q1.

Lead 49 is connected to the collector Q1C of the transistor Q1 and a lead 65 has one end connected to lead 59 and an opposite end connected to emitter Q1E of the transistor Q1. The base Q1B of the transistor Q1 is connected to the control system 61. Also connected to the control system 61 are leads 51, 53, 59 and a lead 67 which is connected to the collector Q1C and which includes a diode D7.

When the switch 55 is closed, current is applied to the electric starter by leads not shown to start the engine. When that occurs, a signal is applied by way of lead 53 and closed switch 55 to the control circuit 61 to turn on the transistor Q1. In operation, as the rotor and hence the rotor coil 47 is rotated by the vehicle engine, and the transistor Q1 is on, AC voltage is generated by the stator coils 23A, 23B, 23C which is rectified by diodes D1–D6 and applied to the plus terminal 27P of the battery 27 to charge the battery. Voltage to power the electrical components of the vehicle is taken from lead 43 by means not shown. Current also flows by way of leads 53, 59, and 65 to the emitter Q1E and from the collector Q1C to lead 49 and then to the rotor field coil 47.

Thus the control circuit 29 senses current from the I input to turn on the regulator to power the rotor field. Also if for any reason voltage stops appearing on the stator tap 33, the circuit 61 will not sense any voltage at the stator terminal S and increases the current pulled through the warning lamp 57 which causes it to illuminate indicating a problem may exist.

The output current of the alternator is a function of the rotor field current and other factors as indicated above. For this reason, if the system voltage decreases too low for any reason, then the current in the rotor's field will decrease reducing the alternators maximum current. If the alternator's maximum output current falls below the system requirements, then the battery will discharge to the point where the engine quits running. When the battery's voltage is low, the prior art systems cannot get as much current through the rotors field and the maximum output of the alternator may be too low.

DETAILED DESCRIPTION OF THE PREFERRED EMBODIMENTS

Figure 2:
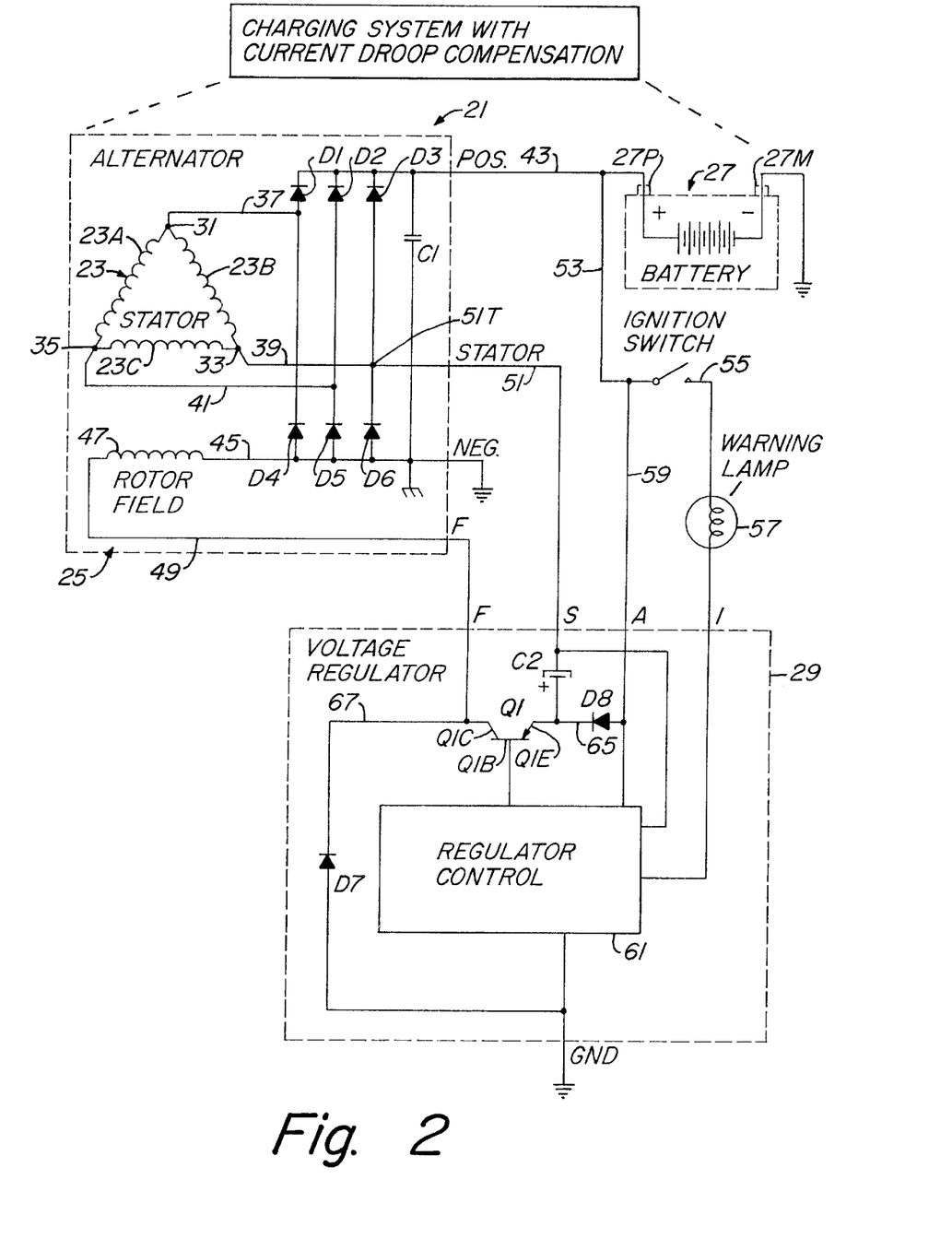
FIG. 2 is a schematic of a vehicle charging system illustrating the invention incorporated therein.
Figure 3A:
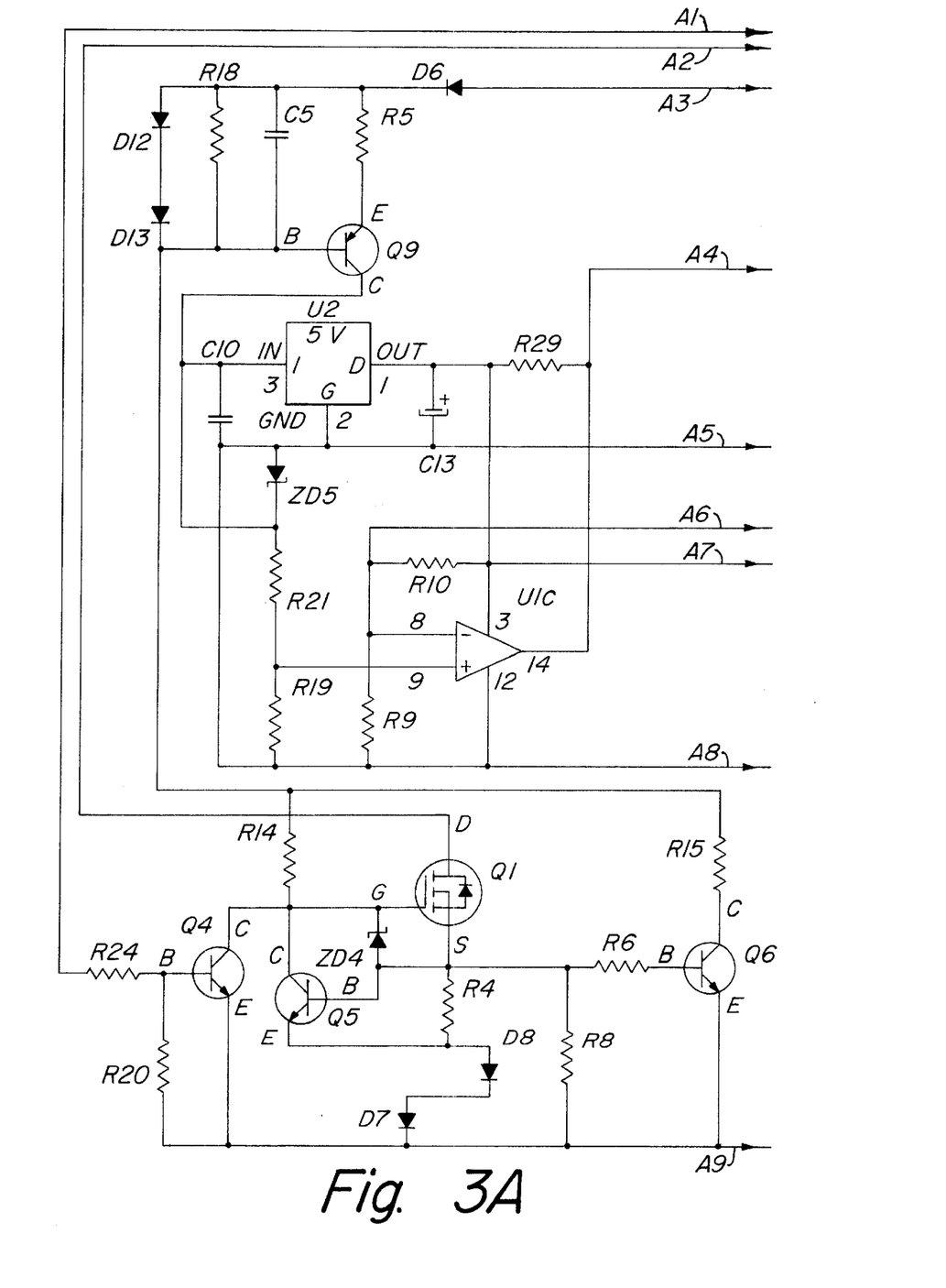
FIG. 3 is a schematic of a regulator utilizing FCDC.
Figure 3B:
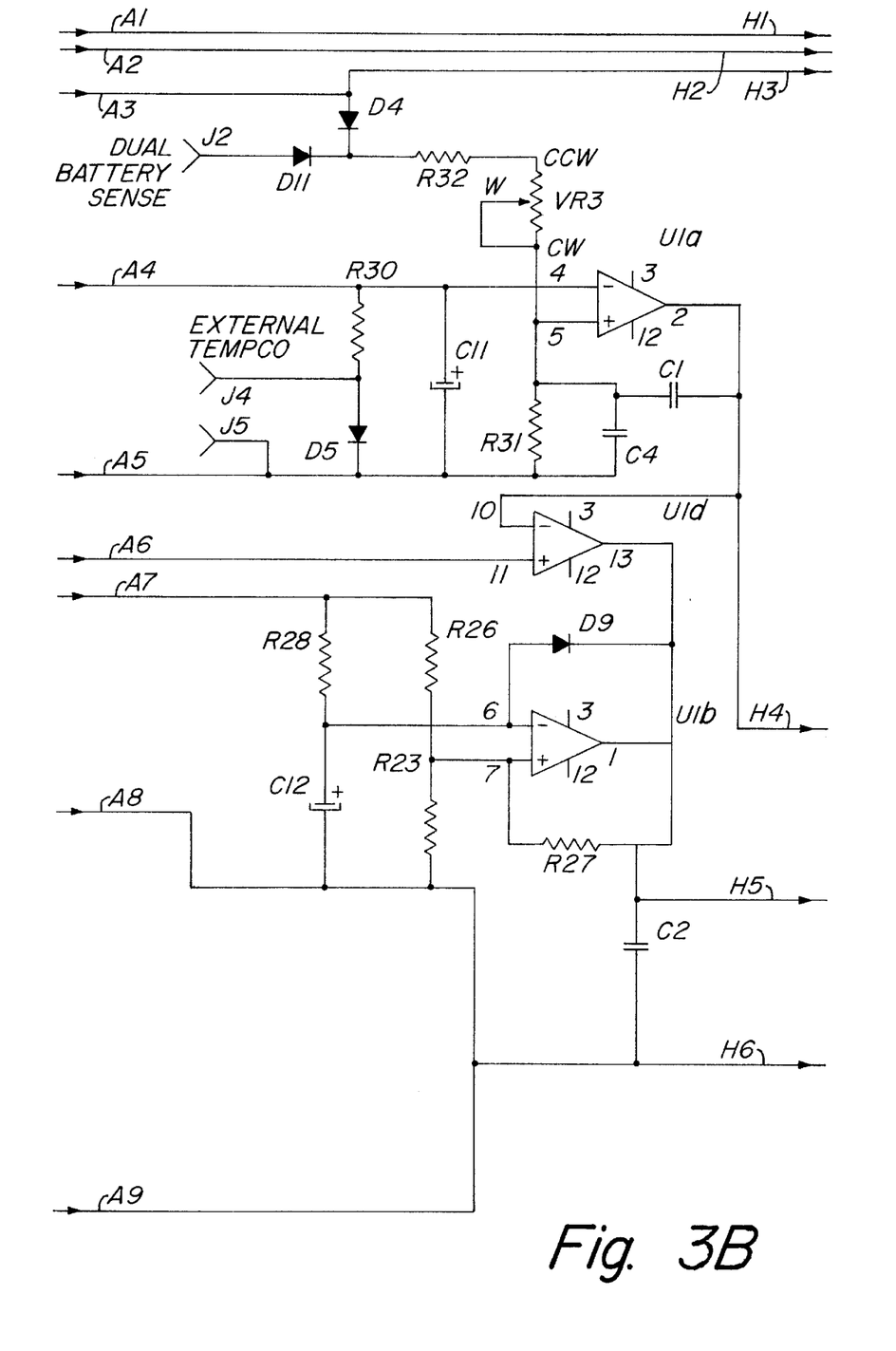
Figure 3C:
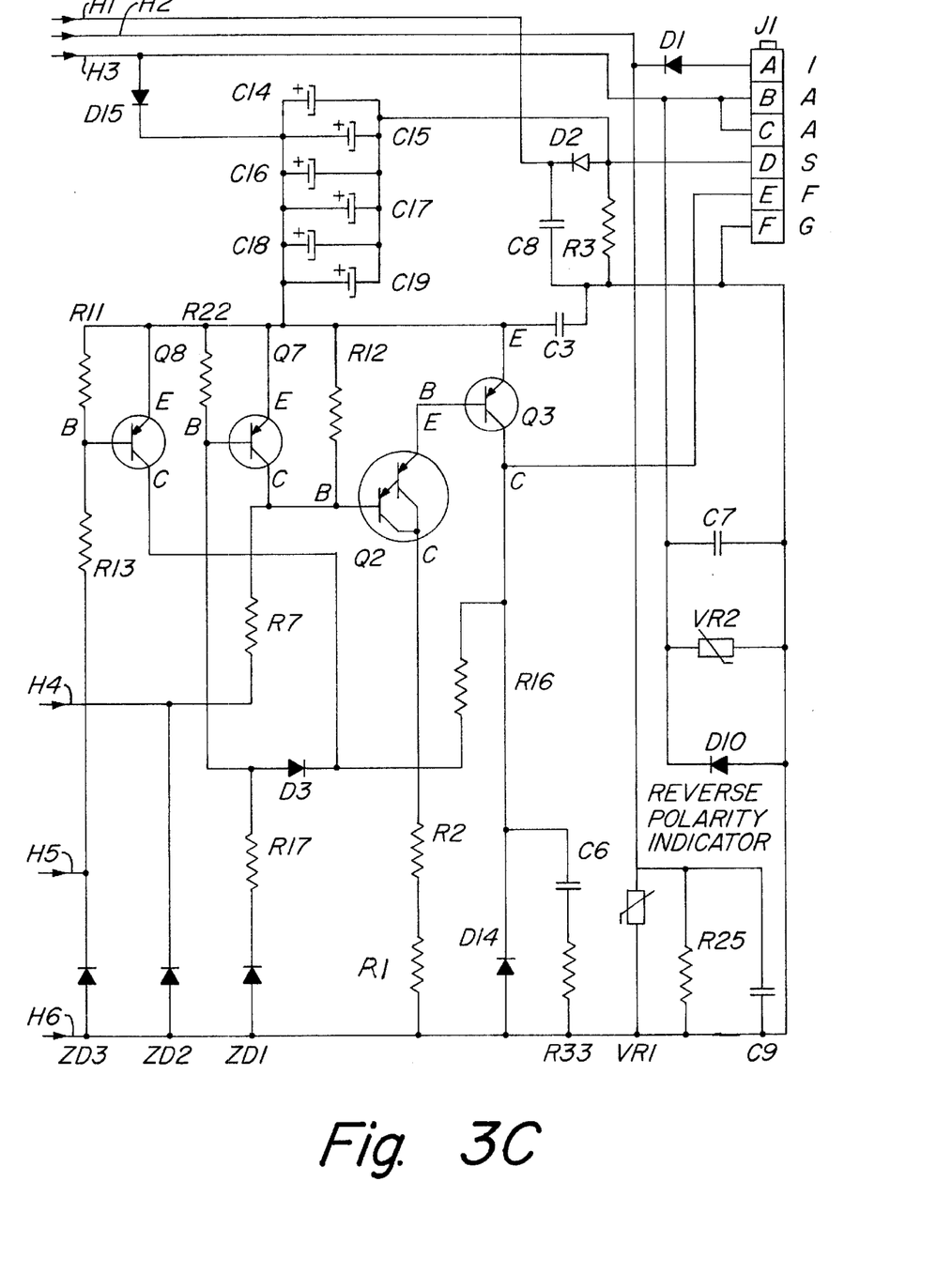

The present invention now will be described. It modifies the system of FIG. 1 to obtain an enhanced alternator output when needed. Referring to FIGS. 2 and 3, a capacitor bank C2, (C14, C15, C16, C17, C18, C19 in FIG. 3) and a diode D8 (D15 in FIG. 3) are connected to the regulator 29 to compensate for the drop in current due to a low voltage and increased resistance by increasing the voltage with C2 and D8. The capacitor bank C2 is coupled to lead 51 and to lead 65 such that its anode is coupled to the emitter Q1E of the transistor Q1. The diode D8 is coupled to lead 65 such that its cathode is directly coupled to the emitter Q1E. The electrical output of the stator 23 basically is an AC output. When the phase at tap 33 swings negative because of the rotating phase of the rotor, the voltage will decrease to a low voltage at tap 51T such that rectifier D6 is forward biased. The tap 51T will be clamped to about −1 volt by rectifier D6. The −1 volt level is applied to the S terminal of the regulator 29. Current then flows through D8 to charge C2. When the voltage then increases because of the rotating phase of the rotor, the voltage at tap 51T increases to a level such that the rectifier D3 is forward biased. This will be about one volt higher than the system voltage which typically is about 14.2 volts. When this happens the voltage on the cathode of the capacitor C2 increases up to i.e. about 15.2 volts. The capacitor C2 had a charge on it of about 14.2 volts. The anode of the capacitor C2 will increase up to i.e. about 29.4 volts. It is connected to the emitter Q1E of Q1. D8 is reversed biased and turns off. The emitter of Q1 sees 29.4 volts so it is able to pass 28–29 volts to the collector of Q1 and hence to the rotor field coil 47 at that time period, each time the rotor moves through a complete cycle. This action will be repeated at a frequency dependent on the rpm of the rotor.

Thus D8 has a dual function. When the S terminal on the regulator is low, below ground, D8 charges C2 and it also supplies system voltage to the emitter of Q1. When the stator voltage on the S terminal increases to about 15.2 volts (rectifier D3 clamps it to system voltage) D8 turns off and C2 raises or boosts the voltage on Q1's emitter to about twice system voltage. C2 and D8 raise the system voltage above what it would normally be to increase the current to the rotors field only when it is necessary since Q1, controlled by the control system 61, controls the voltage going to the rotor's field. D8 and C2 provides more output of the alternator by increasing the current to the rotors field when needed such as when the rotor's field coil heats up and its resistance increases as current flows through it and also when the engine is started on a cold day and when electrical equipment in i.e. a firetruck is on, which provides a high load to the battery.

Referring now to FIG. 3, there will be described a regulator which can be used with the system of FIG. 2. In FIG. 3, D15 is the same as D8; C14–C19 are a capacitor bank that is represented in FIG. 2 by C2; and Q3 is the same as Q1. Current flow is through the A terminal (the positive battery connection). The current has two paths by which it flows to the main switch Q3. First assume there is no stator signal to make the booster circuit (D15 and C14–C19) work. Current would flow through the A terminal through D15 and to the emitter of Q3. When a stator signal is present as in normal operation charge is periodically stored in C14–C19 and used to boost the voltage to the emitter of Q3 in the same manor as described previously. When Q3 is on, power flows through to the collector and back out through the field terminal of the alternator. D14 is a rectifier that is used to clamp the flyback from the rotor, (the rotors magnetic coil). When it is energized there is energy stored in the magnetic field and when the e.m.f. source is removed with Q3 turning off, the energy that is stored in the rotor's field causes the rotor field to "flyback" or produce reverse polarity e.m.f. The voltage would rapidly swing negative to the point where Q3 would be subjected to over voltage breakdown if it was not for D14. D14 works as a clamp. C6 and R33 form a snubber network that dampens any oscillation or ringing from parasitic L/C tank elements in the field circuit. Q2 is used as a triple Darlington amplifier stage in conjunction with Q3. Q2 turns on Q3. Q2 is a Darlington configuration transistor used to increase the current gain of Q3. R2 and R1 limit the current through Q2 to Q3.

Q7 is a protection latch transistor. It is capable of turning off Q2, Q3. When Q7 is on, Q2 turns off which turns off Q3. Q7 is used for overcurrent and over voltage protection. There is a maximum of limit of the current gain of Q3. If the field current is greater than this limit (overcurrent) then there is not enough current gain for Q3 to maintain saturation and the output voltage decreases. D3 is forward biased, current flows through R16, through D3, which turns on Q7 which then turns off Q2 and Q3. Thus Q7 works as an overcurrent latch to protect the regulator from a shorted rotor or field output.

The other condition is an overvoltage condition. When Zener diode (ZD1) is over 36 volts, it will Zener or reverse conduct and current will flow through R17, ZD1 to turn on Q7 which then turns off Q2 and Q3. This helps limit an overvoltage condition that could cause equipment damage.

C7 is used for radio frequency (RF) suppression. It is connected between the ground terminal and the A terminal where the power comes in from the battery. C7 keeps RF from going in or going out. VR2 is a metal oxide varistor and acts as an overvoltage clamp to clamp an overvoltage condition coming in on the A terminal. It reduces overvoltage input transients. Damage to the charging system caused by reverse polarity connection of the battery is extensive and not covered under warranty. D10 is used for reverse polarity indication. It will forward bias and fail due to excessive current if reverse polarity is applied to the regulator i.e. in the event that someone connects the battery improperly, for example in jump starting or battery replacement.

Q7 can turn on and latch off the output of the regulator from two things: the over voltage current through ZD1 or current through a path of D3, R16 in an over current condition. Q7 is reset by Q8, otherwise it would stay latched off in the over current (field off) condition. Periodically a timing pulse is generated by comparator U1b. It is part of a Quad IC identified as an LM-239 which comprises four voltage comparators in a single 14 pin package. In FIG. 3, it is broken down into a, b, c, and d. The part of the circuit comprising U1b generates a timing pulse which turns on Q8 which resets the overcurrent latch Q7 and allows Q2, Q3 to turn back on and resume normal operations if the fault condition no longer exists. Resistors R26, R28 are connected to the output of U2 which is a fixed 5 volt regulator IC. Resistors R26, R23 are a voltage divider that set the peak charge voltage for C12. Resistor R27 provides hysteresis for the reference voltage. Current will flow through R28 to charge C12 to the point where the comparator U1b switches the output. It grounds the output and forward biases D9 which discharges C12 until its charge is less than the reference voltage and the cycle is repeated. Each pulse turns on Q8 which pulls the cathode of D3 close to the voltage of the emitter of Q3 is and when it does that, Q7 turns off which allows normal operations to resume, if the fault condition no longer exists. If the overcurrent condition still exists at the end of the reset pulse then Q7 will turn back on latching Q2, Q3 off. U1b generates reset pulses for the over voltage/over current latch when the field output is supposed to turned on.

Because of the latching action of Q7 a reset pulse is required anytime the field output is to be switched on. U1d provides for this by holding the output of U1b at ground until it is time to turn on the field output. When the regulator does not need to apply current to the rotor's field, then U1b will not generate the reset pulses because U1d holds the output and the cathode of D9 at ground which discharges C2, C12. Whether or not this grounding action takes place is based on two voltages. One is the control voltage from U1a that tells Q2, Q3 pair when to turn on. The other voltage is a reference voltage of 2.5 volts. This is derived from the voltage divider R9, R10 and the 5 volt regulator IC U2. R9 is connected to ground and the other side of R9 is connected to R10. The top side of the voltage divider is connected to the 5 volt output from U2. There will be about 2.5 volts at the common of R9, R10. That voltage is applied to the plus input on U1d. When the inverting input of U1d falls below 2.5 volts which is the voltage on the non-inverting input of U1d, then the output on terminal 13 of U1d will switch to an ungrounded open state. The comparator outputs are basically the collector of a NPN transistor which has an emitter connected to pin 12 which is grounded. The comparator switches the NPN transistor on which grounds the output when the non-inverting input (+) is at a lower voltage than the inverting input (−). When U1a switches it's output transistor on and pin 2 of U1a is grounded internally the internal transistor in U1d turns off allowing the current through R11, R13 to charge C2. The delay due to the charging time of C2 keeps the output protection latch Q7 in a reset state long enough for Q2, Q3 to fully turn on. ZD3 and ZD2 protect the outputs of comparators U1a, U1b, U1c from high voltage transients in the charging system.

The comparator U1a is the main control for the regulator. It compares the system voltage with the reference voltage from U2 and switches the field output to control the alternators output current and thus the system voltage. The regulator works in single or dual battery isolated charging systems. The rectifiers D4 and D11 are connected such that the higher of the two voltages from either the A terminal or J2, minus a 0.6 volt drop will feed R32. This voltage is divided by the network composed of R32, VR3, and R31. VR3 is the potentiometer to allow calibration of the regulation voltage. C4 adds low pass filtration to the network to smooth out high frequency ripple on the system voltage. C1 injects hysteresis into the non-inverting input of the comparator to decrease output switching times in response to a relatively slow changing input voltage. The network composed of R29, R30, D5, C11 has three functions. R29 and R30 divide the voltage from the 5 volt regulator U2. R29 and C11 form a low pass filter to remove high frequency ripple. D5 adds a temperature coefficient to the reference voltage. The forward voltage drop on D5 will decrease with increasing temperature. This allows the regulator to track the ideal charging voltage for lead acid batteries. The higher the temperature of a lead acid battery, the lower the voltage needed to fully charge it. Tracking this temperature coefficient reduces gassing of the battery electrolyte.

When the vehicle's engine is initially started the alternator is not charging and system voltage is less than 14.2 volts. The divided voltage at pin 5 the non-inverting input of U1a is less than the voltage at pin 4 the inverting input. The comparator grounds the output pin 2 which turns on Q2, Q3 and current flows from the field terminal to the field in the alternator. As the current increases in the rotor's field the output current from the alternator increases which raises the system voltage. When the system voltages rises to just over 14.2 volts then U1a senses that voltage on pin 5, the non-inverting input, is greater than the reference voltage at pin 4, the inverting input, and switches the internal output transistor off. With the comparators output ungrounded current stops flowing through R7 to Q2, Q3 which turns the field output off. The energy stored in the inductance of the field causes flyback and the field voltage rapidly decreases to less than 0 volts. When the voltage drops to about 0.6 volts the rectifier D14 becomes forward biased and clamps the voltage by conducting the flyback current to ground. The rotors field current begins to decrease. As it decreases, the output current of the alternator will also decrease and the system voltage will decrease to a point where the voltage at pin 5 of U1A is no longer greater than the voltage of pin 4. Thus the non-inverting input voltage is now less than the inverting input voltage. When that happens the internal NPN transistor in U1a turns on and the cycle repeats itself. This repeating cycle is how the regulator controls the system voltage. It repeats itself many times per second. The duty cycle or ratio of on time to off time varies automatically in response to varying engine RPM and changing loads. The switching action of the output transistors reduces regulator power dissipation compared to linear or constantly varying field output control. It also has faster response times because it does not need frequency compensation to prevent control loop oscillations.

Comparator U1c functions as an undervoltage lockout circuit. The voltage of the collector of Q9, which is close to system voltage, feeds a voltage divider consisting of R21 and R19. The divided voltage at the common is connected to the non-inverting input pin 9 of U1c. If this voltage falls below the reference voltage of 2.5 volts set by R10 and R9 then the output transistor of U1c will turn on and short the reference voltage set by R29 and R30 to ground and turn off U1a because its referenced voltage drops to near zero. This prevents the regulator from energizing the field of the alternator if the system voltage falls below about 7.5 volts. This feature helps to reduce deep depletion damage to battery when the ignition switch is left on without the engine running.

The function of the voltage regulator IC U2 is to provide a 5 volt reference and to power the internal control circuitry with a constant 5 volts. C10 and C13 provide a high frequency bypass and low pass filter for U2. Zener diode ZD5 protects U2 from high voltage transients.

When the ignition switch is off and the engine is not running the regulator shuts down to reduce battery consumption. Q9 handles this by switching the power to U2 and R21 off. When the regulator turns on, current flows through either R14 or R15 which turns on Q9. Current will flow through D6 and R5 to the emitter of Q9, out it's collector to U2 and the control circuits. D6 protects the control circuitry of the regulator from reverse polarity connection of the battery. Q9 is configured as a current source to limit the current through ZD5 in overvoltage transient conditions. D12, D13 and R5 add this functionality. Q9 normally acts as a saturated current source. When current flows through R14 or R15, D12 and D13 limit the maximum voltage at the base of Q9 to about 1.2 volts less than the cathode of D6 since each one of these has a 0.6 volt forward drop. Any current flowing through the emitter of Q9 also flows through R5. If that current exceeds a level that would cause the voltage drop across R5 to exceed 0.6 volts, then Q9 begins to limit it's collector current as the base voltage approaches the 1.2 volt limit set by D13, D12. This happens because the base emitter voltage available decreases and the BE junction is no longer forward biased enough to maintain the collector current level. R18 and C5 prevent leakage current and RF from spuriously turning on Q9. Thus there is a DC load and a high frequency bypass to make sure that Q9 does not unintentionally turn on the regulator. Q9 protects the control circuits and handles switching them on and off.

The S terminal has two functions in addition to providing AC for the voltage boost circuit comprised of D15 and C14–19. The I terminal also has two functions that it shares with the S terminal. Both of these terminals work together. The first function of the S terminal and the first function of the I terminal are to control the regulator switching on and off. An external voltage connected to either of these terminals will turn the regulator on and the regulator will stay on until no voltage appears on either of them. In other words the regulator will turn on and stay on as long as one of these terminals has an external voltage source. The second function of the S terminal is to provide feedback to the regulator to indicate normal or fault operating conditions. The second function of the I terminal is to turn on the warning indicator lamp, located in the vehicle's instrument cluster, in response to the S terminal feedback signal. Simply put, if the S terminal is not receiving AC voltage from the alternator then the regulator increases the current that it draws from the I terminal which causes the warning lamp to illuminate.

The S and I terminal work together intricately to control the on/off function and fault warning indication. When the ignition switch is off and the engine and alternator are not rotating, no AC voltage is generated on the stator of the alternator or present on the S terminal of the regulator. Without this voltage Q4 is turned off and the current through R14 charges the gate of Q1 switching it on. Once the gate is fully charged the current through R14 diminishes below the level required to switch on Q9 which controls power to the regulator control circuits. This is the normal condition when the vehicle and engine are not running.

The I terminal of the regulator is connected through a series warning lamp to the ignition which is connected to the positive battery terminal. The I terminal (ignition terminal) on the regulator is used for two functions. One to sense when to turn the regulator on and the other to turn on the warning lamp in the event there is no AC voltage on the S terminal thus indicating a problem. D1 allows current to flow in only one direction on the I terminal. It prevents reverse voltage from flowing into the regulator in the event that the battery is reverse connected. C9 is a high frequency RF bypass to prevent RF from coming in or out of the regulator. R25 provides a low current load. VR1 is another metal oxide varistor to protect the input on the I terminal from high voltage transients.

When the ignition switch is turned on current will flow through D1 to the drain of Q1 which a metal oxide semiconductor field effect transistor. The function of Q1 is to control the current through the I terminal. That is what turns on the warning lamp. The current through Q1 flows through R4, D8, D7 and R8 to ground causing a voltage rise across R8. The voltage across R8 as a result of Q1 turning on the warning lamp causes current to flow through R6 which turns on Q6. Q6 then draws current through R15 which switches on Q9 and the regulator control circuits. This is the initial turn on method for the regulator when the engine is first being started. ZD4 protects the gate of Q1 from voltage transients greater than 20 volts. Any voltage higher than 20 volts gate to source can destroy the gate oxide insulator in this MOSFET transistor. Q5 and R4 work together to limit the surge current through Q1 when the warning lamp is first energized or in the event that the regulator is installed in a system that does not have a series warning lamp. When the current through R4 increase to the point that the voltage across R4 turns on Q5, then Q5 discharges the gate of Q1 until a balance is achieved. When the ignition switch is on but the alternator is not rotating yet the current through the illuminated warning lamp switches on the regulator.

When the engine is cranked and running the stator in the alternator generates AC voltage in the range from −1 volts to +1 volt greater than the system voltage level. This AC voltage is connected to the S terminal of the regulator. R3 provides a low current low that sinks leakage current from the rectifiers in the alternator. Without this resistor the regulator could falsely sense the voltage from the rectifier leakage current as alternator operation. D2 rectifies the AC from the stator and C8 filters and smoothes it out to DC. The DC voltage causes current to flow through R24 into the base of Q4 which turns it on. The divider network formed by R24, R20 increases the DC threshold voltage for Q4's turn on. When Q4 turns on it draws current through R14 which does two things. The first is that it turns on Q9 which controls the on/off function of the regulator as discussed previously. The second function is that it discharges the gate and turns off Q1 which turns off the warning lamp. Since Q1 is now turned off the current through it that was initially present is no longer available to turn on Q6 and Q9. As long as stator voltage is present on the s terminal due to the rotation of the alternator, Q4 keeps the regulator turned on through R14. This is the normal operation mode of the regulator and the charging system. If for any reason this stator voltage disappears the warning lamp will illuminate assuming the ignition switch is still turned on. The lack of stator voltage indicates a malfunction in the charging system or that the alternator is no longer rotating.

What is claimed is:

1. A regulator for operating an alternator of a motor vehicle, wherein the alternator is of the type having a rotor field coil, a stator coil and rectifiers for maintaining the charge a battery of the vehicle, comprising:

a control switch having an input, an output and a control means, said switch having a conduction state and an off state, a control circuit having an output coupled to said control means for controlling the state of said switch, a field terminal coupled to said output of said switch for applying current to said rotor coil, a stator terminal coupled to said control circuit, an ignition terminal coupled to said control circuit, for turning said regulator on for allowing said control circuit to control the state of said switch, a positive battery terminal coupled to said control circuit and to be coupled to the positive terminal of the battery of the vehicle, a capacitor means and a diode for increasing the current to the field terminal for application to the rotor coil, said capacitor means being coupled between said stator terminal and said input of said switch, said diode having an anode coupled to said positive battery terminal and a cathode coupled to said input of said switch.

2. A system for providing electrical power for a motor vehicle, comprising:

a battery having a positive terminal, an alternator comprising a rotor field coil, a stator coil, rectifiers, and an output coupled to said positive terminal, a control switch having an input, an output and a control means, said switch having a conduction state and an off state, a control circuit having an output coupled to said control means for controlling the state of said switch, a field terminal coupled from said output of said switch and to said rotor coil, a stator terminal coupled to said stator coil and to said control circuit, an ignition terminal coupled to said positive terminal of said battery and to said control circuit and including an on-off switch for actuating said control circuit when said on-off switch is closed, a positive battery terminal, coupled to said positive terminal of said battery and to said control circuit for applying current thereto, a capacitor means and a diode for increasing the current to the rotor coil, said capacitor means being coupled between said stator terminal and said input of said control switch, said diode having an anode coupled to said positive terminal and a cathode coupled to said in put of said control switch.

* * * * *